Oct. 14, 1969 G. SEULEN ET AL 3,472,991
INDUCTOR FOR SURFACE-HARDENING ROTATING SHAFTS
Filed Jan. 18, 1968 2 Sheets-Sheet 1 they are adapted to be clamped together in any desired position of overlap.

3,472,991
INDUCTOR FOR SURFACE-HARDENING ROTATING SHAFTS
Gerhard Seulen and Friedhelm Reinke, Remscheid, Germany, assignors to AEG-Elotherm G.m.b.H., Remscheid-Hasten, Germany
Filed Jan. 18, 1968, Ser. No. 698,927
Claims priority, application Germany, Nov. 14, 1967,
A 57,365
Int. Cl. H05b 9/02, 5/00, 9/06
U.S. Cl. 219—10.79                       6 Claims

ABSTRACT OF THE DISCLOSURE

For inductively heating workpieces having a shaft portion and an end portion of greater diameter, e.g. a flange portion, which workpieces have different lengths of shaft portion, an inductor is provided which is extensible or contractible over the length fitting over the shaft portion of the workpiece, by having two parts of the inductor overlapping to provide an electrically conducting path through the overlap.

---

This invention relates to the inductive surface-hardening of workpieces having an elongate cylindrical shaft portion having an end portion of greater diameter, for instance a flange.

To harden the surface of such workpieces by concurrently hardening the whole of their surface whilst the work rotates, the workpiece is mounted between workholding means and the workpiece rotated about its axis. Hitherto the rotating workpiece was heated with an inductor formed by a loop extending along the entire length on one side of the workpiece, and then quenching the heated workpiece.

Workpieces of the described kind were previously inductively hardened by concurrently heating the entire surface of the rotating workpiece, using a special inductor constructed for each type and length of workpiece that was to be hardened. The present invention is concerned with the avoidance of this disadvantage by the provision of an inductor that can be adapted to heat a number of workpieces of different lengths.

The invention provides inductors which may be used for the inductive heating of elongate workpieces which substantially differ in length one from another thereby necessitating the provision of workholding means which to be sufficiently large to accommodate the differences in length of the workpieces, have diameters which exceed the diameter of the shaft of the workpieces. The inductors according to the invention may be used for inductively heating workpieces of the type described which differ in length between the maximum available distance between the workholding means and about half this distance.

The invention consists of an inductor for surface hardening rotating workpieces having an elongate cylindrical shaft and an end portion of greater diameter than the shaft, comprising a heating conductor loop shaped to extend over the entire length of the shaft of a workpiece surface to define a shell-shaped surface, the said loop being divided across its length into conductor portions which are relatively slidably displaceable in overlapping electrically conducting contact, which portions are adapted to be clamped together in any desired position of overlap.

Inductors according to the invention are particularly suitable for the heating of elongate cylindrical workpieces having a flanged end.

FIGURE 1 of the accompanying drawings illustrates the application of the invention, and which is a perspective view of a workpiece 1 having an elongate shaft with a flange at one end, having an inductor loop extending along the entire length of the said elongate shaft, which inductor is divided across its length into a fixed portion 2 and an axially movable portion 3. The axially movable portion 3 of the heating conductor loop is slidably displaceable in relation to the stationary portion 2 but remains in electrically conducting contact therewith. This permits the heating conductor loop, i.e. the inductor, to be adjusted to the length of the workpiece that is to be treated.

Thus when adapting the inductor to a workpiece having a different length of shaft from a workpiece previously heated, one portion of the inductor loop may be a fixed portion, the other portion thus being a axially slidably movable portion.

A particular and preferred form of the invention relates to the degree of overlap between the relatively movable portions of the conductor loop. With a considerable degree of overlap, the surface of the workpiece tends not to be uniformly heated and hardened as is desirable. A different heating pattern results when the distance of overlap between the heating conductors 2 and 3 is relatively short, the resulting greater current density and longer time of action in the region of overlap causing a temperature lead. These effects are illustrated in FIGURES 2 and 3 of the drawings, which are longitudinal cross sections of a portion of the shaft of a workpiece, with the overlapping portion of the inductor diagrammatically superimposed thereon.

Thus in FIGURE 2 the ends of the two portions 2 and 3 of the heating conductor loop overlap and make contact along a long distance. In this region of overlap a conductor of twice the normal width is therefore formed in which the current flowing in the direction of the arrow has a density of approximately only half that obtaining in the single conductor. Despite the greater length of time a surface element of the rotating workpiece will remain within the effective range of the overlapped portion, the temperature rise of this surface element will nevertheless lag behind that generated in a single conductor of the combination.

In FIGURE 3 of the drawings, the degree of overlap is much less, the current taking the path shown by the arrow, and the resulting current density and longer time of action in the region of overlap causes a temperature lead over that generated by a single conductor.

In order to avoid such differential heating effects in the region of overlap, an important and preferred feature of the invention consists in restricting electrical contact between the relatively movable portions of the loop to a length of conductor equal to the width of up to one and a half times the width of a corresponding single heating conductor.

In an inductor according to the invention having a fixed portion and a movable portion, the said fixed portion of the loop preferably consists of a hollow copper tube of oblong section having a wider face remote from the workpiece reinforced with a copper band, which preferably is soldered or welded thereto. Preferably the said movable portion of a conductor according to the invention consists of a hollow copper tube of oblong section provided with a wedge-shaped, preferably soldered, copper section welded to its narrower side along its adjustable length of overlap. In a particularly preferred embodiment of the invention the said oblong section copper tubes of the stationary and/or movable portions of the conductor loop contain two cooling channels.

The electrical and mechanical connection between the relatively movable portions may be established by a U-shaped clamping yoke provided with a clamping screw and a contact making blade.

Further embodiments of the invention are hereinafter described and illustrated in FIGURES 4, 5 and 6 of the accompanying drawings, in which.

Figure 4:
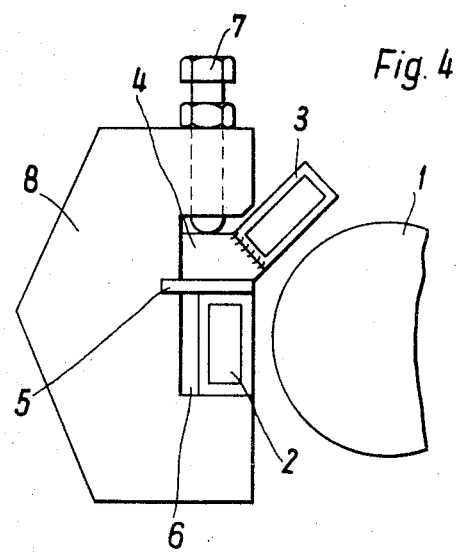
FIGURE 4 is a part sectional representation of the junction between the fixed and movable portions of the conductor loop.

Referring first to FIGURE 4 the stationary conductor portion 2 is reinforced for improving its mechanical strength by a rectangular copper section 6 soldered to the straight part of the conductor. The adjustable conductor portion 3 is provided along its entire adjustable length of overlap with a wedge-shaped copper section 4 soldered thereto, the said copper section 4 being so shaped and so affixed to the conductor that its surfaces are parallel to the narrow side of the conductor portion 2. A screw 7 which works in a clamping yoke 8 is adapted to grip this copper surface. In the centre of its U-shaped open mouth the clamping yoke 8 is fitted with a projecting contact blade 5 made of an electrically high conductive material. When the inductor has been adjusted for use, the said blade 5 forms the electrical connection between the two conductor portions 2 and 3. The axial length of the blade is about one to one and a half times the width of a corresponding single heating conductor. The width of the heating conductor is understood to be the width of the narrower side of the rectangular section hollow tube. For achieving special heating effects the heating conductor portions may be provided in conventional manner with L- or U-shaped laminated iron cores.

Figure 1:
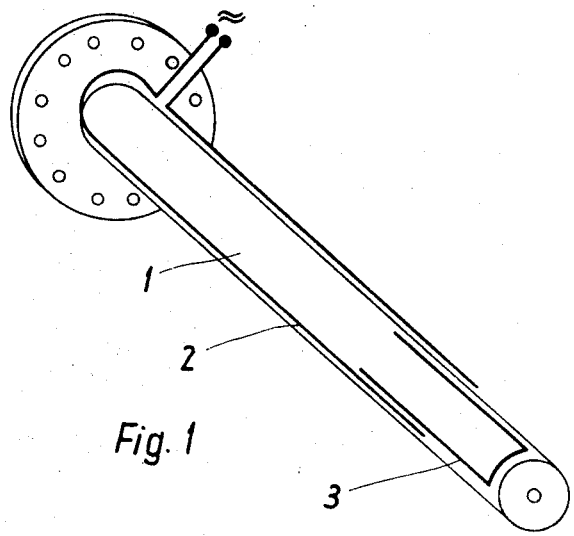
Figures 5, 6:
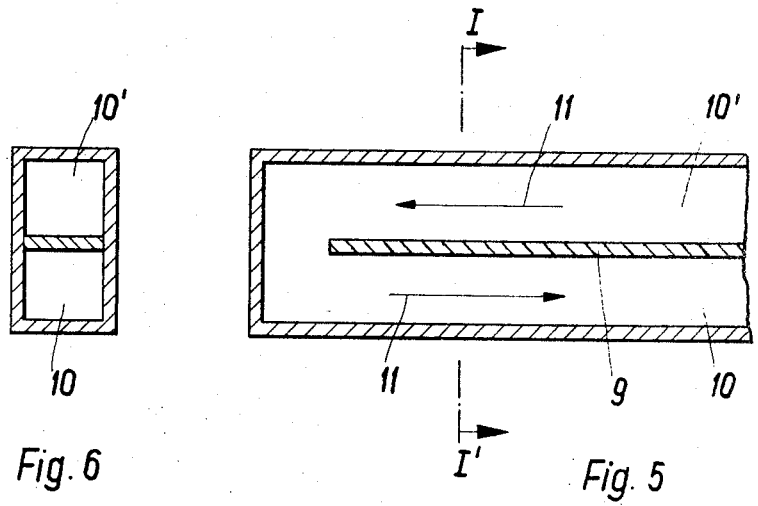
FIGURE 5 is a sectional representation of the two channels in the conductors.
FIGURE 6 is a section taken on the line I–I' in FIGURE 5.
Figure 2:
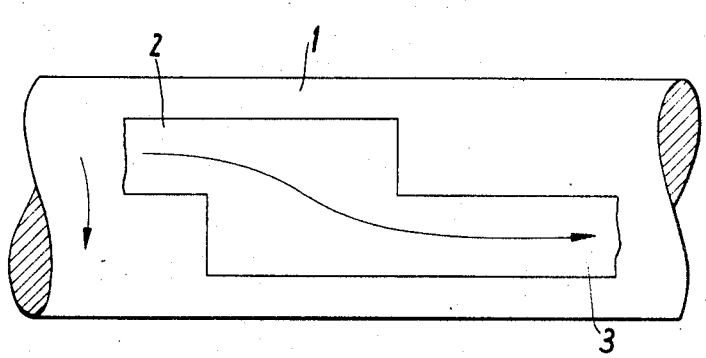
Figure 3:
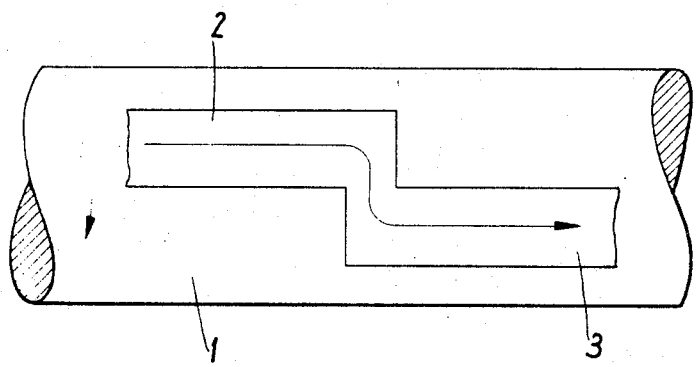

For sufficiently cooling the conductors they may with advantage be constructed in the manner shown in FIGURES 5 and 6. The rectangular section hollow interior is longitudinally divided into two channels 10 and 10' by a central partition wall 9. The channels communicate only at the end of a conductor portion. Consequently each conductor portion through which a liquid coolant may flow in the direction indicated by arrows 11 provides both a forward and a return channel. This eliminates the need of providing connections for the admission and/or discharge of a coolant for instance at the point where the clamp is provided or anywhere along the lapped lengths.

What is claimed is:

1. An inductor for surface-hardening rotating workpieces having an elongated cylindrical shaft and an end portion of greater diameter than the shaft, said inductor comprising a heating conductor loop shaped to extend over the entire length of the shaft of a workpiece surface to define a shell-shaped surface, the axis of said loop being transverse to the axis of said shaft, the said loop being divided across its length into conductor portions which are relatively slidably displaceable in overlapping electrically conducting contact, which portions are adapted to be clamped together in any desired position of overlap.

2. An inductor according to claim 1, in which the electrically conducting contact between the relatively movable portions of the conductor loop is confined to a length corresponding to between one and one and a half times the width of the conductor forming said loop.

3. An inductor according to claim 1 in which the electrical and mechanical connection between the relatively movable portions of the heating conductor loop is established by a U-shaped clamping yoke provided with a clamping screw and a contact blade.

4. An inductor according to claim 1, comprising a fixed portion and a slidably movable portion, the said fixed portion of the loop being formed from a hollow oblong section copper tube having relatively wider and narrower faces with the surfaces of said wider faces being parallel to the axis of said shaft, said hollow section being provided on a wider face remote from the workpiece with a reinforcing copper band adjacent said remote wider face.

5. An inductor according to claim 4, comprising a fixed portion and a slidably movable portion, the said movable portion consisting of a hollow oblong copper tube provided on one of its narrower sides with a wedge-shaped copper section extending along the adjustable length of overlap of said movable portion, a surface of said wedge-shaped section being in electrical contact with said fixed portion.

6. An inductor according to claim 4, in which the said oblong section copper tubes forming the fixed and movable portions of the heating loop are provided with two internal cooling channels.

References Cited

UNITED STATES PATENTS 2,643,325   6/1953   Body et al. _____ 219—10.79 X

JOSEPH V. TRUHE, Primary Examiner

U.S. Cl. X.R.

219—10.43, 10.57, 10.59